United States Patent Office 2,728,883
Patented Dec. 27, 1955

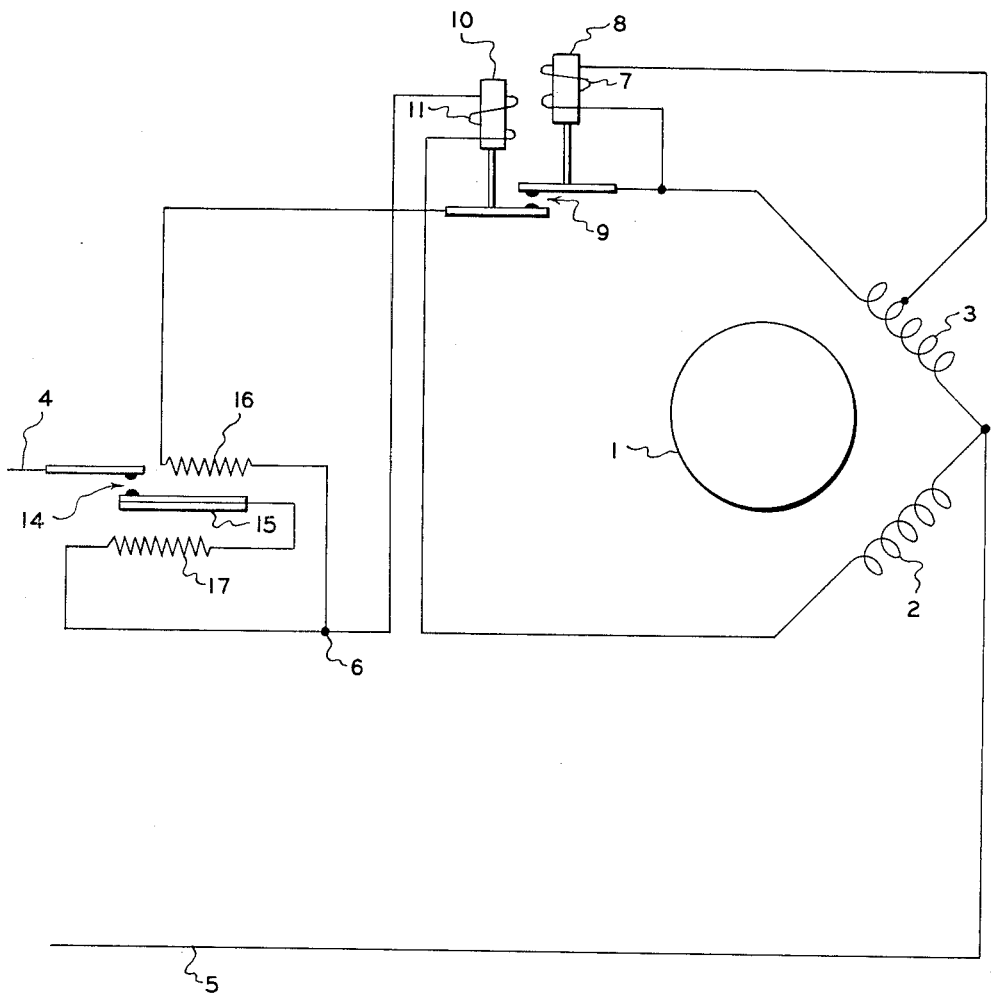

2,728,883
MOTOR PROTECTION DEVICE

Earl F. Hubacker, Louisville, Ky., assignor to General Electric Company, a corporation of New York Application September 16, 1954, Serial No. 456,407

1 Claim. (Cl. 318—221)

This invention relates to a motor protection device and, more particularly, to a device for protecting high speed single phase motors.

While a single phase motor is running, suitable means operated by the motor are provided for cooling the motor so that the windings will not become overheated due to the large current passing therethrough. However, when the motor stalls or stops due to a low voltage condition, for example, and the high current is still supplied to the main winding, it will be obvious that the main winding will be damaged in a short period of time if suitable means are not provided for removing this heat or the flow of current is not stopped.

In hermetic compressors of the refrigeration type, the motor is disposed within a sealed casing so that air cannot be employed to cool the windings unless there is conduction from the windings to the casing. If the motor is suspended in the casing by springs, for example, then obviously there is no means of conducting the heat to the casing when the rotor stalls so that the windings will burn out if the flow of current is not interrupted in this type of motor.

While it is desirable to stop the flow of current as soon as possible after the rotor stalls, it is still necessary in some single phase motors used in hermetic compressors, for example, that a high current, which will damage the windings quickly if the rotor stalls, be supplied to operate the motor.

A primary object of this invention is to provide a motor protective device to energize the starting winding of a single phase motor whenever the motor falls below a predetermined speed.

A further object of this invention is to provide a device for automatically restarting a single phase motor whenever it stops or stalls due to a low voltage condition.

Further objects and advantages of the invention will become apparent as the following description proceeds and the features of novelty which characterize the invention will be pointed out with particularity in the claim annexed to and forming a part of this specification.

In accordance with the present invention, there is provided a motor protection circuit for a motor including a running circuit, a starting circuit and an auxiliary circuit connected in parallel with at least a portion of the starting winding. The starting circuit includes a pair of contacts, one of which is operated by an armature actuated by a solenoid coil or winding in the running circuit to maintain the contacts closed when the current in the running circuit is above a predetermined value and to open the contacts when the current is below that value. The other contact is operated by an armature actuated by a solenoid coil or winding in the auxiliary circuit to close the contacts when the auxiliary circuit is deenergized.

For a better understanding of the invention reference may be had to the accompanying drawing, in which the single figure is a wiring diagram of a single phase motor embodying the present invention.

Referring to the drawing, there is shown a single phase electric motor comprising a rotor 1, a main or running winding 2, and a starting winding 3. A power line 4 is connected to one side of the running circuit that includes the running winding 2 and a power line 5 is connected to the opposite side of the running circuit to which one end of the starting circuit that includes the starting winding 3 is also connected. The other end of the starting circuit and the running circuit are connected at 6 to the power supply line 4.

An auxiliary circuit having a solenoid winding or coil 7 is connected in parallel with at least a portion of the starting winding. This solenoid winding 7 cooperates with an armature 8 to form an electromagnetic means. This armature 8 is connected to one of the pair of spring biased starting contacts 9 that are positioned in the starting circuit to control the flow of current through the starting winding of the motor. The other of the starting contacts 9 is connected to an armature 10 that cooperates with a solenoid winding 11 in the running circuit to form a second electromagnetic means. These two electromagnetic means and the starting contacts 9 form the starting relay for the single phase motor of the present invention.

A pair of contacts 14 are disposed in the power line 4 to control the supply of current to both the running and starting circuits. One of the contacts 14 is connected to a bimetal member 15 that opens the contacts 14 when heated sufficiently. This bimetal member 15 is subject to heat from a resistance heater 16 in the starting circuit and a second resistance heater 17 in the power supply line.

Considering the operation of the present invention, current is supplied to both the running and starting circuits when the motor is started as the contacts 9 and 14 are closed at the start. This results in both the winding 7 and winding 11 being energized so that both armatures 8 and 10 are lifted. Since the armature 10 is lifted as well as the armature 8, it is apparent that the spring-biased contacts 9 will remain closed. However, as the motor reaches a predetermined speed, the current in the running circuit drops so that the energization in the solenoid winding 11 is reduced to a predetermined current value at which the armature 10 drops and breaks the starting contacts 9 to open the starting circuit.

The rotation of the rotor 1 induces a voltage in the start windings 3 that is approximately ninety degrees out of phase with the voltage in the main winding 2. This induced voltage generates a current in the auxiliary circuit so that the solenoid winding 7 remains energized whereby the armature 8 is held up so that the contacts 9 remain separated after being opened by the armature 10. If the motor stops or stalls due to low voltage, for example, the solenoid winding 7 is no longer energized since the rotor is not rotating and the armature 8 drops to again close the contacts 9. These contacts 9 remain closed until the motor reaches the predetermined speed at which the contacts again open as previously stated.

If repeated attempts to start the motor fail in that the rotor stalls or stops as soon as it is started, it will be seen that the main winding 2 could become heated to such an extent that it may be damaged or burned out. The resistance heaters 16 and 17 serve to prevent the windings from overheating since a continuous large current passing through the heaters 16 and 17 for a predetermined period will result in the bimetal member 15 becoming heated to such an extent that it will break the contacts 14.

Thus, the present invention provides a device for automatically starting the motor as soon as it stops or stalls but at the same time preventing the windings from being damaged by overheating.

While the present invention has been described by reference to a particular embodiment thereof, it will be understood that modifications may be made by those skilled in the art without actually departing from the invention. Therefore, the appended claim is intended to cover all such variations as come within the true spirit and scope of the invention.

I claim:

In combination, a single phase motor including a rotor, a starting winding, and a running winding, starting and running circuits for said motor, a pair of contacts in said starting circuit to open said starting circuit, an auxiliary circuit connected in parallel with at least a portion of said starting winding, said auxiliary circuit being energized when said rotor is running, a solenoid winding in said auxiliary circuit, an armature actuated by said solenoid winding and connected to one of said contacts, a solenoid winding in said running circuit, and a second armature actuated by said solenoid winding in said running circuit and connected to the other of said contacts, said second armature maintaining said contacts closed when the current in said running circuit exceeds a predetermined current value, said second armature opening said contacts when the current in said running circuit is below said predetermined current value, said first armature closing said contacts when said auxiliary circuit is de-energized.

References Cited in the file of this patent

UNITED STATES PATENTS

| | | |
|---|---|---|
| 1,921,127 | Hutt | Aug. 8, 1933 |
| 1,997,573 | Boothby | Apr. 16, 1935 |
| 2,133,400 | Raney | Oct. 18, 1938 |
| 2,165,082 | Weber | July 4, 1939 |
| 2,255,437 | Pearce | Sept. 9, 1941 |
| 2,338,515 | Johns | Jan. 4, 1944 |
| 2,490,877 | Linfors | Dec. 13, 1949 |
| 2,502,099 | Linfors | Mar. 28, 1950 |
| 2,512,070 | Nelson et al. | June 20, 1950 |

FOREIGN PATENTS

| | | |
|---|---|---|
| 472,019 | Canada | Mar. 6, 1951 |